G. C. BOVEY.
Gate.
No. 30,784. Patented Nov. 27, 1860.
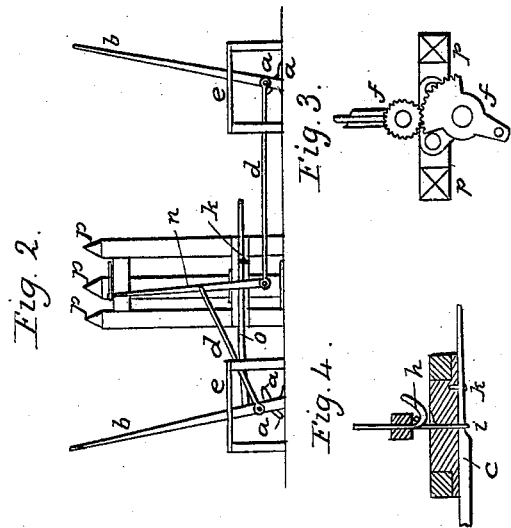
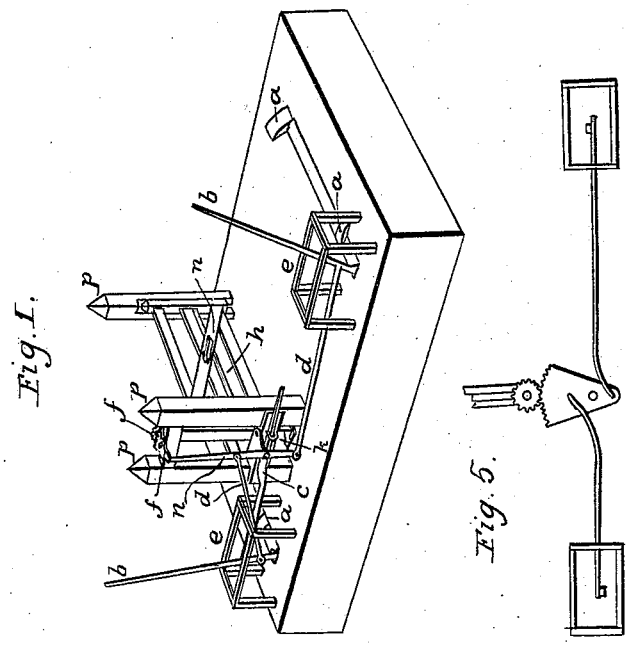
Witnesses:
Inventor:
Geo C Bovey

UNITED STATES PATENT OFFICE.

GEORGE C. BOVEY, OF CHILLICOTHE, OHIO, ASSIGNOR TO HIMSELF, AND D. C. RUGGLES, OF CINCINNATI, OHIO.

FARM-GATE.

Specification of Letters Patent No. 30,784, dated November 27, 1860.

*To all whom it may concern:*

Be it known that I, GEORGE C. BOVEY, of Chillicothe, in the county of Ross and State of Ohio, have invented a new and Improved Farm-Gate; and I do hereby declare that the following is a full and exact description thereof, reference being had to the accompanying drawings and to the letters of reference marked thereon.

Figure 1 is a perspective view of the gate showing the levers and latch, &c. Fig. 2 is a transverse section showing the position of levers and connecting rods. Fig. 3 is a top view showing the operation of the rack and pinion. Fig. 4 is a section view showing the manner in which the latch is operated. Fig. 5 is a view showing the operation of the rack and pinion to be placed at the bottom of the gate instead of the top, without using the connecting rod $n$.

$a$, $a$, $a$, $a$, are the levers upon which the wheels of any vehicle may press to open or shut the gate.

$b$, $b$, $b$, $b$, are levers connecting with rods $d$ and $n$ for the purpose of opening the gate by hand from horseback or otherwise.

$c$, $c$, is a bar so arranged and connected with the levers, $b$, and, $a$, as to unlatch the gate.

$d$, $d$, $d$, $d$, are rods connecting levers $b$, $b$, with upright lever $n$ to operate rack and pinion.

$e$, $e$, are protection guards around levers $b$, $b$, as shown in the model.

$p$, $p$, $p$, $p$, are the posts of the gate arranged as shown in the model.

$i$ is the link, moving when operated upon by bar, $c$, for the purpose of unlatching the gate.

$k$ is a staple to guide bar $c$ in its movements.

$h$ is the connecting rod between latch and link, $i$.

$m$ is a catch, holding the gate open by catching over bar $c$ as shown in the model.

$n$ is an upright lever operating with levers $d$, $d$ and rack, $f$, for the purpose of opening and readjusting the gate.

$f$, $f$, $f$, $f$, is the rack and pinion arranged as shown in the model for the purpose of opening and shutting the gate in connection with levers $b$ and connecting rods $d$, $d$, and, $n$.

The operation by which the gate is traversed is such that by the pressure of the wheels of a vehicle upon the levers $a$ which are firmly fixed upon a shaft being the extension of the levers $b$ that those levers in connection with the levers $d$ and $n$ with the rack and pinion $f$ serve to open and shut the gate—while the bar $c$ is brought forward so that the latch $m$ catches upon it to hold the gate firmly when opened.

I do not claim broadly the use of the levers, rack and pinion for operating the gate; but

I claim—

The arrangement of the levers, rack, and pinion when used in connection with the catch $m$ and bar $c$ for holding the gate firmly when open, all as set forth, for the purposes described.

GEO. C. BOVEY.

Witnesses:
C. H. BLISS,
HENRY C. RYAN.